United States Patent
Nakano et al.

(10) Patent No.: US 12,441,884 B2
(45) Date of Patent: *Oct. 14, 2025

(54) RHEOLOGY CONTROL AGENT AND CURABLE COMPOSITION USING THE SAME

(71) Applicant: KUSUMOTO CHEMICALS, LTD., Tokyo (JP)

(72) Inventors: Kyohei Nakano, Saitama (JP); Hiroki Ouchi, Saitama (JP); Kenji Fukui, Saitama (JP)

(73) Assignee: KUSUMOTO CHEMICALS, LTD., Tokyo (JP)

( * ) Notice: Subject to any disclaimer, the term of this patent is extended or adjusted under 35 U.S.C. 154(b) by 620 days.

This patent is subject to a terminal disclaimer.

(21) Appl. No.: 17/427,281

(22) PCT Filed: Dec. 23, 2019

(86) PCT No.: PCT/JP2019/050436
§ 371 (c)(1),
(2) Date: Jul. 30, 2021

(87) PCT Pub. No.: WO2020/158252
PCT Pub. Date: Aug. 6, 2020

(65) Prior Publication Data
US 2022/0135798 A1 May 5, 2022

(30) Foreign Application Priority Data
Jan. 31, 2019 (JP) .................. 2019-016546

(51) Int. Cl.
*C08L 83/04* (2006.01)
*C08J 3/22* (2006.01)
(Continued)

(52) U.S. Cl.
CPC ............... *C08L 83/04* (2013.01); *C08J 3/226* (2013.01); *C08K 5/20* (2013.01); *C09J 11/06* (2013.01);
(Continued)

(58) Field of Classification Search
CPC ....... C08L 83/04; C08L 2310/00; C08J 3/226; C08J 2377/08; C08J 2491/00; C08K 5/20;
(Continued)

(56) References Cited

U.S. PATENT DOCUMENTS 4,128,436 A * 12/1978 O'Hara .................... C09D 7/43
524/904
4,778,843 A * 10/1988 Cooperman ........... C08G 69/44
528/335

(Continued)

FOREIGN PATENT DOCUMENTS

CN     101463244 A    6/2009
EP     0 809 556 B1    10/1998
(Continued)

OTHER PUBLICATIONS

Office Action issued on Jan. 17, 2023, in corresponding Japanese patent Application No. 2020-569444, 4 pages.
(Continued)

*Primary Examiner* — Mark Eashoo
*Assistant Examiner* — Cullen L G Davidson
(74) *Attorney, Agent, or Firm* — XSENSUS LLP (57) ABSTRACT

A rheology control agent for a curable composition includes: a diamide compound (A) and/or a hydrogenated castor oil (A'), the diamide compound (A) being obtained by condensation reaction between a diamine component (A1) and a monocarboxylic acid component (A2); and a polyamide compound (B) obtained by polycondensation of an amine component (B1) and a carboxylic acid component (B2). The
(Continued)

amine component (B1) contains at least one amine selected from the group consisting of a diamine and a triamine having 2 to 54 carbon atoms. The carboxylic acid component (B2) contains at least one carboxylic acid selected from the group consisting of a dicarboxylic acid and a tricarboxylic acid having 4 to 54 carbon atoms. The polyamide compound (B) is obtained by polycondensation of at least one of the amine component (B1) and the carboxylic acid component (B2) containing polymerized fatty acids.

7 Claims, 1 Drawing Sheet

(51) Int. Cl.
*C08K 5/20* (2006.01)
*C09J 11/06* (2006.01)
*C09J 11/08* (2006.01)
*C09J 183/04* (2006.01)
*C09K 3/10* (2006.01)

(52) U.S. Cl.
CPC ............. *C09J 11/08* (2013.01); *C09J 183/04* (2013.01); *C09K 3/1018* (2013.01); *C08J 2377/08* (2013.01); *C08J 2491/00* (2013.01); *C08L 2310/00* (2013.01); *C09K 2200/047* (2013.01); *C09K 2200/0667* (2013.01); *C09K 2200/0685* (2013.01)

(58) Field of Classification Search
CPC . C09J 11/06; C09J 11/08; C09J 183/04; C09J 2301/408; C09J 2479/02; C09K 3/1018; C09K 2200/047; C09K 2200/0667; C09K 2200/0685; C09K 3/1006; C09K 3/00; C08G 77/46; C08G 69/34
See application file for complete search history.

(56) References Cited

U.S. PATENT DOCUMENTS

| | | | |
|---|---|---|---|
| 4,927,739 A | 5/1990 | Taniguchi et al. | |
| 5,180,802 A | 1/1993 | Hartman et al. | |
| 8,809,429 B2 * | 8/2014 | Azeyanagi | C09D 7/45 106/504 |
| 2005/0176880 A1 * | 8/2005 | Fujii | C09D 175/12 524/589 |
| 2017/0022402 A1 | 1/2017 | Lutz et al. | |

FOREIGN PATENT DOCUMENTS

| | | | |
|---|---|---|---|
| JP | S51-002750 A | 1/1976 | |
| JP | 56-112977 A | 9/1981 | |
| JP | 4-236225 A | 8/1992 | |
| JP | 4-301643 A | 10/1992 | |
| JP | 2005-220286 A | 8/2005 | |
| JP | 2014-227427 A | 12/2014 | |
| JP | 2017-518391 A | 7/2017 | |
| KR | 10-0990964 B1 | 11/2010 | |

OTHER PUBLICATIONS

Office Action issued on Jan. 3, 2023, in corresponding Chinese patent Application No. 201980084567.2, 12 pages.
Office Action issued on Jan. 10, 2022, in corresponding Taiwanese patent Application No. 108147130, 16 pages.
Odian G.: "Principles of Polymerization, Fourth Edition" In: "Principles of Polymerization", Jan. 1, 2004 (Jan. 1, 2004), John Wiley & Sons, Inc, XP055957137, ISBN: 978-0-471-27400-1, 6 pp.
Extended European Search Report issued Sep. 14, 2022, in corresponding European Patent Application 19912858.8, 14pp.
Taiwanese Office Action issued Sep. 27, 2022, in corresponding Taiwanese Patent Application 108147130, including English translation, 16pp.
International Search Report and Written Opinion mailed on Mar. 31, 2020, received for PCT Application PCT/JP2019/050436, Filed on Dec. 23, 2019, 12 pages including English Translation.

* cited by examiner

RHEOLOGY CONTROL AGENT AND CURABLE COMPOSITION USING THE SAME

CROSS-REFERENCE TO RELATED APPLICATIONS

The present application is based on PCT filing PCT/JP2019/050436, filed Dec. 23, 2019, which claims priority to JP 2019-016546, filed Jan. 31, 2019, the entire contents of each are incorporated herein by reference.

TECHNICAL FIELD

The present invention relates to a rheology control agent and a curable composition using the same.

BACKGROUND ART

As a rheology control agent (thickener) for curable compositions such as sealants and adhesives, a fine powder of hydrogenated castor oil or fatty acid diamide is typically used (for example, see PTL 1). This fine powder, when heated or sheared in a medium such as a resin or a solvent, changes its form into an acicular shape to exhibit a rheology modifying effect (hereinafter, the change into acicular shape to enable the rheology control agent to exhibit the rheology modifying effect is referred to as "activation").

CITATION LIST

Patent Literature

PTL 1: JPS56112977 A

SUMMARY OF INVENTION

Technical Problem

The above rheology control agent is typically added during manufacturing of a curable composition such as a sealant (specifically, at the time of mixing a resin, a plasticizer, a filler, or the like), and partially activated by heat produced by kneading and applied during kneading. However, it is difficult to activate 100% of the added rheology control agent only using heat produced by kneading and applied during kneading.

In such a case, an inactivated portion of the rheology control agent may be activated during storage of a curable composition such as a sealant. Activation during storage causes an increase in viscosity of the curable composition during storage, leading to a problem of deterioration in storage stability. In particular, when the curable composition is stored in a high temperature environment, the viscosity greatly increases during storage, which causes significant deterioration in storage stability. In addition, when the curable composition contains a filler such as a pigment, the dispersion state of the filler may change during storage. This causes a change in viscosity (increase or decrease in viscosity) during storage, which may result in deterioration in storage stability.

The present invention has been made in view of the above circumstances, and has an object to provide a rheology control agent capable of reducing deterioration in storage stability of a curable composition due to activation of the rheology control agent during storage or a change in filler dispersion state.

Solution to Problem

As a result of intensive research to achieve the above object, the present inventors have found that the deterioration in storage stability of a curable composition due to activation of the rheology control agent during storage or a change in filler dispersion state can be reduced without lowering the initial viscosity by using a composition obtained by mixing a specific polyamide compound with a fatty acid diamide and/or a hydrogenated castor oil, which are conventionally used as a rheology control agent. The present invention has been made based on these findings.

An aspect of the present invention is a rheology control agent for a curable composition, including: a diamide compound (A) and/or a hydrogenated castor oil (A'), the diamide compound (A) being obtained by condensation reaction between a diamine component (A1) and a monocarboxylic acid component (A2); and a polyamide compound (B) obtained by polycondensation of an amine component (B1) and a carboxylic acid component (B2), wherein the amine component (B1) contains at least one amine selected from the group consisting of a diamine with 2 to 54 carbon atoms and a triamine with 2 to 54 carbon atoms, the carboxylic acid component (B2) contains at least one carboxylic acid selected from the group consisting of a dicarboxylic acid with 4 to 54 carbon atoms and a tricarboxylic acid with 4 to 54 carbon atoms, and the polyamide compound (B) is a polyamide obtained by polycondensation of at least one of the amine component (B1) containing polymerized fatty acid derivatives and the carboxylic acid component (B2) containing polymerized fatty acids.

In the above aspect of the present invention, the polyamide compound (B) preferably has a weight-average molecular weight of 2,000 to 50,000.

In the above aspect of the present invention, the amine component (B1) preferably contains a diamine or a triamine with 2 to 12 carbon atoms.

In the above aspect of the present invention, the carboxylic acid component (B2) preferably contains at least polymerized fatty acids.

In the above aspect of the present invention, a reaction molar ratio (B1/B2) between the amine component (B1) and the carboxylic acid component (B2) is preferably less than 1.

In the above aspect of the present invention, a cured product of the curable composition may be used as a sealant or an adhesive.

Another aspect of the present invention is a curable composition including: a binder; and the rheology control agent described above.

In the above aspect of the present invention, the curable composition may further contain a filler.

Advantageous Effect of the Invention

According to the present invention, since the rheology control agent is obtained by mixing a diamide compound and/or hydrogenated castor oil with a specific polyamide compound, deterioration in storage stability of a curable composition due to activation of the rheology control agent during storage or a change in filler dispersion state can be reduced without lowering the initial viscosity.

DESCRIPTION OF THE EMBODIMENTS

A preferred embodiment of the present invention will now be described in detail with reference to the drawings as necessary.

[Rheology Control Agent]

A rheology control agent according to the present invention is an additive used for a curable composition, the rheology control agent being obtained by mixing a diamide compound (A) and/or hydrogenated castor oil (A') with a polyamide compound (B). The details of the diamide compound (A), the hydrogenated castor oil (A'), and the polyamide compound (B) will be described below.

(Diamide Compound (A))

The diamide compound (A) according to the present invention is a fatty acid diamide obtained by condensation reaction between a diamine component (A1) and a monocarboxylic acid component (A2).

Examples of the diamide compound (A) include a fatty acid diamide (a) having three components which are N-12 hydroxystearic acid N'-alkanoic acid ethylene (tetramethylene) diamide, N,N'-12 hydroxystearic acid ethylene (tetramethylene) diamide, and N,N'-alkanoic acid ethylene (tetramethylene) diamide as main components. The fatty acid diamide (a) is obtained by adding an equivalent amount of ethylenediamine or tetramethylenediamine (1,4-diaminobutane) to a mixture of a hydrogenated castor oil fatty acid and a linear saturated fatty acid (hereinafter, simply referred to as "alkanoic acid") for an amidation reaction. Therefore, when the fatty acid diamide (a) is used as the diamide compound (A), the diamine component (A1) is ethylenediamine or tetramethylenediamine, and the monocarboxylic acid component (A2) is a mixture of a hydrogenated castor oil fatty acid and an alkanoic acid.

The general formulae of the main components of the fatty acid diamide (a) are as follows.

(1) N-12 hydroxystearic acid N'-alkanoic acid ethylene (tetramethylene) diamide

$$CH_3(CH_2)_5CHOH(CH_2)_{10}CONH(CH_2)_2NHCO(CH_2)_lCH_3$$

or $$CH_3(CH_2)_5CHOH(CH_2)_{10}CONH(CH_2)_4NHCO(CH_2)_lCH_3 \quad [Chem. 1]$$

(where l is a natural number.)

(2) N,N'-12 hydroxystearic acid ethylene (tetramethylene) diamide

[Chem. 2]

(3) N,N'-alkanoic acid ethylene (tetramethylene) diamide $$CH_3(CH_2)_nCONH(CH_2)_2NHCO(CH_2)_mCH_3$$

or $$CH_3(CH_2)_nCONH(CH_2)_4NHCO(CH_2)_mCH_3 \quad [Chem. 3]$$

(where n and m are each natural numbers.)

The fatty acid diamide (a) contains, in addition to the three components of (1) to (3), some unreacted raw materials and side reaction products.

The diamide compound (A) according to the present invention is not limited to the fatty acid diamide (a) described above, and may include any other diamide compound obtained by a condensation reaction of the diamine component (A1) and the monocarboxylic acid component (A2), which are listed below, for example. The conditions of the condensation reaction (reaction temperature, formulation ratio of the components, and the like) may be set as appropriate by a known method.

Examples of the diamine component (A1) according to the present invention include: aliphatic diamines such as ethylenediamine (EDA), propylene diamine, tetramethylenediamine (TMDA), hexamethylenediamine (HMDA), octamethylenediamine (OMDA), and dodecamethylenediamine (DMDA); aromatic diamines such as xylylene diamine, diaminodiphenylmethane, diaminodiphenyl ether, diaminodiphenyl sulfone, and methylenebischloroaniline; and cycloaliphatic diamines such as piperazine and isophorone diamine.

Examples of the monocarboxylic acid component (A2) according to the present invention include saturated aliphatic monocarboxylic acids such as acetic acid, propionic acid, butyric acid, valeric acid, caproic acid, enanthic acid, caprylic acid, pelargonic acid, capric acid, lauric acid, myristic acid, palmitic acid, stearic acid, hydrogenated castor oil fatty acid, arachidic acid, and behenic acid; and unsaturated aliphatic monocarboxylic acid such as oleic acid, linoleic acid, ricinoleic acid, linolenic acid, eicosenoic acid, erucic acid, and mixed fatty acid obtained from natural fat and oils (tall oil fatty acid, rice bran fatty acid, soybean oil fatty acid, tallowate, etc.).

(Hydrogenated Castor Oil (A'))

The hydrogenated castor oil (A') is a triglyceride of a saturated fatty acid obtained by hydrogenating castor oil. The hydrogenated castor oil (A') may be a commercially available product, and examples thereof include C-wax (manufactured by Kokura Synthetic Industries, Ltd.), Kao wax 85P (manufactured by Kao Corporation), hydrogenated castor oil A (manufactured by Itoh Oil Chemicals Co., Ltd.), and hydrogenated castor oil (Yamakei Industries Co., Ltd.).

As the components of the rheology control agent according to the present invention, the following three combinations are possible: (1) the diamide compound (A) and the polyamide compound (B); (2) the hydrogenated castor oil (A') and the polyamide compound (B); and (3) the diamide compound (A), the hydrogenated castor oil (A'), and the polyamide compound (B).

(Polyamide Compound (B))

The polyamide compound (B) according to the present invention is a polyamide obtained by polycondensation of an amine component (B1) and a carboxylic acid component (B2). The amine component (B1) according to the present invention contains at least one amine selected from the group consisting of diamines with 2 to 54 carbon atoms and triamines with 2 to 54 carbon atoms as an essential component. Further, the carboxylic acid component (B2) contains at least one carboxylic acid selected from the group consisting of dicarboxylic acids with 4 to 54 carbon atoms and tricarboxylic acids with 4 to 54 carbon atoms as an essential component. The polyamide compound (B) is a polyamide obtained by polycondensation of at least one of an amine component (B1) containing polymerized fatty acid derivatives and a carboxylic acid component (B2) containing polymerized fatty acids. That is, as an essential component of the raw material of the polyamide compound (B) according to the present invention, at least one of amines as polymerized fatty acid derivatives and polymerized fatty acids is contained. For synthesis of the polyamide compound (B), the following combinations of the amine component (B1) and the carboxylic acid component (B2) are possible: amines as polymerized fatty acid derivatives and polymerized fatty acids; a diamine or triamine other than polymerized fatty acid derivatives and polymerized fatty acids; and amines as polymerized fatty acid derivatives and a dicarboxylic acid or a tricarboxylic acid other than polymerized fatty acids.

The polyamide compound (B) may be a polyamide having any chemical structure as long as it is a polymer compound obtained by polycondensation of the above amine component (B1) and the carboxylic acid component (B2), and having an amide bond (—CONH—). In the following description, the amine component (B1) and the carboxylic acid component (B2) used for synthesis of the polyamide compound (B), physical properties of the polyamide compound (B), and a method of synthesizing the polyamide compound (B) will be described in this order.

<Amine Component (B1)>

As the amine component (B1), at least one amine selected from the group consisting of diamines with 2 to 54 carbon atoms and triamines with 2 to 54 carbon atoms can be used. Examples of the above diamines include: aliphatic diamines such as ethylenediamine (EDA), propylene diamine, tetramethylenediamine (TMDA), hexamethylenediamine (HMDA), octamethylenediamine (OMDA), and dodecamethylenediamine (DMDA); aromatic diamines such as xylylene diamine, diaminodiphenylmethane, diaminodiphenyl ether, diaminodiphenyl sulfone, and methylenebischloroaniline; and cycloaliphatic diamines such as piperazine and isophorone diamine. Further, examples of the above triamines include aliphatic triamines such as diethylenetriamine.

Further, as the amine component (B1) according to the present invention, diamines or triamines derived from polymerized fatty acids, which are polymerized fatty acid derivatives, can also be used. Examples of such polymerized fatty acid derivatives include dimer diamines (DDA), which are dimer acid derivatives, and trimer triamines (TTA), which are trimer acid derivatives. Dimer acids are polymerized fatty acids obtained by polymerizing (dimerizing) unsaturated fatty acids (for example, unsaturated fatty acid having 18 carbon atoms) obtained from vegetable oil such as soybean oil, tall oil, linseed oil, cottonseed oil, or the like. Typically, dimer acids having 36 carbon atoms are commercially available. Although commercially available dimer acids contain monomer acids and trimer acids in addition to dimer acids, those having high dimer acid content are preferred. Dimer diamines are dimer acid derivatives in which two terminal carboxyl groups of the dimer acid are substituted with primary aminomethyl groups or amino groups, and those commercially available can be used. Further, trimer acids are polymerized fatty acids obtained based on dimer acids by increasing the trimer acid content by distillation purification or the like. Typically, trimer acids having 54 carbon atoms are commercially available. Although commercially available trimer acids contain monomer acids and dimer acids in addition to trimer acids, those having high trimer acid content are preferred. Trimer triamines are trimer acid derivatives in which three terminal carboxyl groups of the trimer acid are substituted with primary aminomethyl groups or amino groups, and those commercially available can be used.

Further, as the amine component (B1), monoamines may also be used in combination with the above diamines and/or triamines within a range that does not hinder the effect of improving storage stability of the rheology control agent according to the present invention. Examples of the monoamines that can be used for the amine component (B1) include ethylamine, monoethanolamine, propyl amine, butyl amine, pentyl amine, hexyl amine, octyl amine, decyl amine, lauryl amine, myristyl amine, cetyl amine, stearyl amine, and behenyl amine.

The compounds used as the above amine component (B1) can be used singly or as a mixture of two or more.

In order to enhance the effect of suppressing a decrease in initial viscosity and the effect of improving storage stability of the curable composition containing the rheology control agent according to the present invention, the amine component (B1) preferably contains a diamine or a triamine having 2 to 12 carbon atoms regardless of whether the rheology control agent contains the diamide compound (A) or the hydrogenated castor oil (A'). When the rheology control agent is composed of the diamide compound (A) and the polyamide compound (B), the amine component (B1) containing a diamine or a triamine having 2 to 8 carbon atoms provides a particularly strong effect of improving storage stability. When the rheology control agent is composed of the hydrogenated castor oil (A') and the polyamide compound (B), the amine component (B1) containing a diamine or a triamine having 2 to 12 carbon atoms provides a particularly strong effect of improving storage stability. Among these diamines or triamines, in particular, it is preferred that at least one diamine selected from the group consisting of ethylenediamine, tetramethylenediamine, hexamethylenediamine, octamethylenediamine, and dodecamethylenediamine is contained as the amine component (B1). As an essential component of the raw material of the polyamide compound (B), at least one of amines as polymerized fatty acid derivatives and polymerized fatty acids is contained. Accordingly, when a diamine or a triamine having 2 to 12 carbon atoms is used as the amine component (B1), it is required to contain at least polymerized fatty acids having 4 to 54 carbon atoms as the carboxylic acid component (B2).

<Carboxylic Acid Component (B2)>

As the carboxylic acid component (B2), at least one carboxylic acid selected from the group consisting of dicarboxylic acids with 4 to 54 carbon atoms and tricarboxylic acids with 4 to 54 carbon atoms can be used. Examples of the dicarboxylic acids include succinic acids, glutaric acids, adipic acids, pimelic acids, suberic acids, azelaic acids, sebacic acids, dodecanedioic acids, maleic acids, fumaric acids, phthalic acids, isophthalic acids, terephthalic acids, and dimer acids. Dimer acids are polymerized fatty acids obtained by polymerizing (dimerizing) unsaturated fatty acids (for example, unsaturated fatty acid having 18 or 22 carbon atoms) obtained from vegetable oil such as soybean oil, tall oil, linseed oil, cottonseed oil, or the like. Typically, dimer acids having 36 or 44 carbon atoms are commercially available. Although commercially available dimer acids contain monomer acids and trimer acids in addition to dimer acids, those having high dimer acid content are preferred.

Further, the examples of the above tricarboxylic acids include trimer acids and trimesic acids. Trimer acids are polymerized fatty acids obtained based on dimer acids by increasing the trimer acid content by distillation purification or the like. Typically, trimer acids having 54 carbon atoms are commercially available. Although commercially available trimer acids contain monomer acids and dimer acids in addition to trimer acids, those having high trimer acid content are preferred.

Further, as the carboxylic acid component (B2), monocarboxylic acids may also be used in combination with the above dicarboxylic acids and/or tricarboxylic acids within a range that does not hinder the effect of improving storage stability of the rheology control agent according to the present invention. Examples of the monocarboxylic acids that can be used for the carboxylic acid component (B2) include: saturated aliphatic monocarboxylic acids such as acetic acid, propionic acid, butyric acid, valeric acid, caproic acid, enanthic acid, caprylic acid, pelargonic acid, capric acid, lauric acid, myristic acid, palmitic acid, stearic acid, hydrogenated castor oil fatty acid, arachidic acid, and behenic acid; and unsaturated aliphatic monocarboxylic acid such as oleic acid, linoleic acid, ricinoleic acid, linolenic acid, eicosenoic acid, erucic acid, and mixed fatty acids obtained from natural fat and oils (tall oil fatty acid, rice bran fatty acid, soybean oil fatty acid, tallowate, etc.).

When a monocarboxylic acid is contained as the carboxylic acid component (B2), it is preferred to contain a monocarboxylic acid having 2 to 22 carbon atoms for further improving storage stability. Among these, it is particularly preferred to contain a hydrogenated castor oil fatty acid.

The compounds used as the above carboxylic acid component (B2) can be used singly or as a mixture of two or more.

In order to enhance the effect of suppressing a decrease in initial viscosity and the effect of improving storage stability of the curable composition containing the rheology control agent according to the present invention, the carboxylic acid component (B2) preferably contains at least polymerized fatty acids. The polymerized fatty acids used as the carboxylic acid component (B2) of the present invention are polymers obtained by polymerizing a monobasic fatty acid having an unsaturated bond or a polymer obtained by polymerizing an ester of a monobasic fatty acid having an unsaturated bond. The monobasic fatty acid having an unsaturated bond may be typically an unsaturated fatty acid having 1 to 3 unsaturated bonds and having 8 to 24 total carbon atoms. Examples of the unsaturated fatty acid include oleic acid, linoleic acid, linolenic acid, natural drying oil fatty acids, and natural semi-drying oil fatty acids. The ester of a monobasic fatty acid having an unsaturated bond may be an ester of the monobasic fatty acid having an unsaturated bond and an aliphatic alcohol, preferably an aliphatic alcohol having 1 to 3 carbon atoms. Among these polymerized fatty acids, dimer acids and trimer acids are particularly preferred as the carboxylic acid component (B2).

When the carboxylic acid component (B2) contains at least the above polymerized fatty acids, the amine component (B1) is not specifically limited, and may be polymerized fatty acid derivatives (for example, dimer diamine or trimer triamine) or may be a diamine or a triamine other than polymerized fatty acid derivatives. However, in order to enhance the effect of suppressing a decrease in initial viscosity and the effect of improving storage stability of the curable composition containing the rheology control agent according to the present invention, it is preferred that the amine component (B1) is a diamine or a triamine having 2 to 12 carbon atoms when the carboxylic acid component (B2) contains at least the polymerized fatty acids. As a particularly preferred combination, the amine component (B1) is at least one diamine selected from the group consisting of ethylenediamine, tetramethylenediamine, hexamethylenediamine, octamethylenediamine, and dodecamethylenediamine, and the carboxylic acid component (B2) is polymerized fatty acids of at least one of a dimer acid and a trimer acid.

<Physical Properties of Polyamide Compound (B)>

The polyamide compound (B) according to the present invention preferably has a weight-average molecular weight Mw of 2,000 or more and 50,000 or less. When the weight-average molecular weight Mw of the polyamide compound (B) is within the above range, the effect of improving storage stability can be enhanced without lowering the initial viscosity of the curable composition containing the rheology control agent according to the present invention. In the composition in which the rheology control agent is composed of the diamide compound (A) and the polyamide compound (B), in order to further enhance the effect of suppressing a decrease in initial viscosity and the effect of improving storage stability, the weight-average molecular weight Mw of the polyamide compound (B) is more preferably 2,000 or more and 19,000 or less, and still more preferably 2,000 or more and 12,000 or less. Further, in the composition in which the rheology control agent is composed of the hydrogenated castor oil (A') and the polyamide compound (B), the effect of improving storage stability is particularly high when the polyamide compound (B) has the weight-average molecular weight Mw of 3,500 or more and 12,000 or less, and the initial viscosity tends to be higher compared with the case using the diamide compound (A). The present inventors consider the reason for this is basically that the hydrogenated castor oil (A') is easily activated compared to the diamide compound (A).

The weight-average molecular weight Mw described herein is a value calculated based on a molecular weight of standard polystyrene in a chromatogram measured by gel permeation chromatography (GPC).

<Method of Synthesizing Polyamide Compound (B)>

The polyamide compound (B) according to the present invention can be synthesized by polycondensation reaction between the above-mentioned amine component (B1) and the carboxylic acid component (B2) under known reaction conditions. For example, the amine component (B1) and the carboxylic acid component (B2) as raw materials are introduced into a reaction vessel such as a four-neck flask, and the raw materials are stirred in an inert gas atmosphere (for example, under a nitrogen gas stream or the like) to prepare a mixture. Then, the mixture of the raw materials are heated and subjected to a polycondensation reaction at 150° C. to 200° C. for 2 to 10 hours to synthesize the polyamide compound (B).

In this process, a reaction molar ratio (B1/B2) between the amine component (B1) and the carboxylic acid component (B2) is preferably less than 1. That is, it is preferred that an excess amount (molar ratio) of the carboxylic acid component (B2) to the amine component (B1) is subjected to a polycondensation reaction. In this case, at least one terminal of the polyamide compound (B) is a carboxyl group. However, in order to obtain the effect of improving storage stability required in the present invention, it is not necessarily required that at least one terminal of the polyamide compound (B) is a carboxyl group, but all the terminals may be amino groups. Further, the reaction molar ratio (B1/B2) refers to the ratio (molar ratio) of the amount of the amine component (B1) to the amount of the carboxylic acid component (B2).

(Method of Producing Viscosity Modifier)

The rheology control agent containing the diamide compound (A) and/or the hydrogenated castor oil (A') and further containing the polyamide compound (B) can be produced as follows. For example, the diamide compound (A) and/or the hydrogenated castor oil (A') are heated and melted, and then, the polyamide compound (B) is added thereto and melted and mixed. In this process, the melting temperature may be higher than or equal to the melting points of the diamide compound (A), the hydrogenated castor oil (A'), and the polyamide compound (B). Then, a melt in which the diamide compound (A) and/or the hydrogenated castor oil (A') is melted and mixed with the polyamide compound (B) is taken out as a solid. The solid of a mixture, in which the diamide compound (A) and/or the hydrogenated castor oil (A') is mixed with the polyamide compound (B), is broken down into a desired particle size. Thus, a powdery rheology control agent containing the diamide compound (A) and/or the hydrogenated castor oil (A') and further containing the polyamide compound (B) is prepared. The method of breaking down the solid, in which the diamide compound (A) and/or the hydrogenated castor oil (A') is mixed with the polyamide compound (B), is not specifically limited, and for example, a jet mill can be used.

In production of the rheology control agent, the formulation amount of the polyamide compound (B) is preferably 1 mass % or more and 50 mass % or less of the total amount of the polyamide compound (B) and the diamide compound (A) and/or the hydrogenated castor oil (A'). When the formulation amount of the polyamide compound (B) is within the above range, the effect of improving storage stability can be enhanced without lowering the initial viscosity of the curable composition containing the rheology control agent according to the present invention. In the composition in which the rheology control agent is composed of the diamide compound (A) and the polyamide compound (B), the lower limit of the formulation amount of the polyamide compound (B) is more preferably 5 mass % or more for further enhancing the effect of suppressing a decrease in initial viscosity, and 10 mass % or more for further enhancing the effect of improving storage stability. On the other hand, the upper limit of the formulation amount of the polyamide compound (B) is more preferably 20 mass % or less for further enhancing the effect of suppressing a decrease in initial viscosity, and 30 mass % or less for further enhancing the effect of improving storage stability. Further, in the composition in which the rheology control agent is composed of the hydrogenated castor oil (A') and the polyamide compound (B), the lower limit of the formulation amount of the polyamide compound (B) is more preferably 5 mass % or more for further enhancing the effect of suppressing a decrease in initial viscosity and the effect of improving storage stability. On the other hand, the upper limit of the formulation amount of the polyamide compound (B) is more preferably 30 mass % or less for further enhancing the effect of suppressing a decrease in initial viscosity and the effect of improving storage stability.

(Applications of Viscosity Modifier)

The rheology control agent according to the present invention is suitably applied to additives for curable compositions used for sealants, adhesives, pressure-sensitive adhesives, coating materials, molding agents, vibration-proofing materials, damping materials, sound-proofing materials, foaming materials, paints, spraying materials, and the like used for buildings, ships, automobiles, roads, and the like. Among these applications, the rheology control agent according to the present invention is particularly suitable when the cured product of the curable composition is a sealant or an adhesive.

[Curable Composition]

The curable composition according to the present invention contains a binder, and the rheology control agent described above as essential components. The curable composition according to the present invention may further contain a plasticizer, a filler, and other additives such as a water scavenger and an adhesion promoter as optional components. The content of the rheology control agent for the curable composition of the present invention varies depending on the type of resin, which is a binder in the curable composition, the formulation composition of a filler such as a pigment, or the like. Typically, the content is 0.1 parts by mass or more and 30 parts by mass or less, and preferably 1 part by mass or more and 20 parts by mass or less, when the total resin solid content in the curable composition is 100 parts by mass. When the content of the rheology control agent is within the above range, a sufficient storage stability can be imparted to the curable composition.

(Binder)

Examples of the resin contained as a binder in the curable composition include modified silicone resins. Modified silicone resins contain, as a main component, a silyl group-terminated polyether in which a reactive silyl group is introduced into the terminal. For example, when a modified silicone resin is used as a binder of a curable composition such as a sealant, the modified silicone resin preferably cures in the presence of water and forms a siloxane bond. Examples of the modified silicone resin include a silyl modified polymer, which is formed by introducing a silyl group into a hydroxyl group terminal of a linear or branched polyoxyalkylene polymer which is a main chain. Other examples of the silyl modified polymer include silyl modified polyurethane, silyl modified polyester, silylated acrylate, and silyl group-terminated polyisobutylene. The modified silicone resin may be obtained by a known synthesis method, or may be a commercially available product. Examples of the commercially available product of the modified silicone resin include MS polymer 5810, MS polymer 5202, MS polymer 5203, and MS polymer 5303 manufactured by Kaneka Corporation, and Excestar manufactured by AGC Inc.

Examples of the resin contained as a binder of the curable composition include, in addition to the modified silicone resins described above, silicone resins, acrylic resins, acrylic urethane resins, alkyd resins, polyester resins, urethane resins, epoxy resins, polysulfide resins, amino resins, butyl rubbers, and commercially available oily caulking materials. These resins may be, for example, thermosetting type, UV-curable type, EB-curable type, oxidative curable type, photocationic curable type, peroxide curable type, or acid/epoxy curable type that cure with chemical reaction in the presence or absence of a catalyst, or may be resins having high glass transition point and forming a film only by volatilizing a diluting solvent without involving chemical reactions. Further, examples of the curing agent include amino resins, melamine resins, isocyanate compounds, block isocyanate compounds, and epoxy compounds.

(Plasticizer)

Examples of the plasticizer include dimethyl phthalate (DMP), diethyl phthalate (DEP), di-n-butyl phthalate (DBP), diheptyl phthalate (DHP), dioctyl phthalate (DOP), diisononyl phthalate (DINP), diisononyl 1,2-cyclohexanedicarboxylate (DINCH), diisodecyl phthalate (DIDP), ditridecyl phthalate (DTDP), butyl benzyl phthalate (BBP), dicyclohexyl phthalate (DCHP), tetrahydrophthalic ester, dioctyl adipate (DOA), diisononyl adipate (DINA), diisodecyl adipate (DIDA), di-n-alkyl adipate, dibutyl diglycol adipate (BXA), bis(2-ethylhexyl) azelate (DOZ), dibutyl sebacate (DBS), dioctyl sebacate (DOS), dibutyl maleate (DBM), di-2-ethylhexyl maleate (DOM), dibutyl fumarate (DBF), tricresyl phosphate (TCP), triethyl phosphate (TEP), tributyl phosphate (TBP), tris(2-ethylhexyl) phosphate (TOP), tris(chloroethyl) phosphate (TCEP), tris(dichloropropyl) phosphate (CRP), tributoxyethyl phosphate (TBXP), tris($\beta$-chloropropyl) phosphate (TMCPP), triphenyl phosphate (TPP), octyl diphenyl phosphate (CDP), acetyl triethyl citrate, acetyl tributyl citrate, trimellitic acid-based plasticizer, polyester-based plasticizer, polyether-based plasticizer, epoxy-based plasticizer, chlorinated paraffin, stearic acid-based plasticizer, dimethyl polysiloxane, and process oil.

(Filler)

Examples of the filler include extender pigments such as calcium carbonate (ground calcium carbonate (GCC), precipitated calcium carbonate (PCC), and the like), barium sulfate, silicon dioxide, aluminum hydroxide, talc, organic fibers, and glass powder; coloring pigments such as titanium dioxide, carbon black, chrome yellow, cadmium yellow, ocher, titanium yellow, zinc chromate, iron oxide red, aluminosilicate, quinacridone pigments, phthalocyanine pigments, anthraquinone pigments, diketopyrrolopyrrole pigments, benzimidazolone pigments, and isoindolinone pigments; and metallic pigments such as aluminum flakes, copper flakes, micaceous iron oxide, mica, and scaly powder of mica coated with metal oxide.

(Other Additives)

The curable composition of the present invention may contain other substances within a range that does not impair the characteristics thereof and purposes of the present invention. Examples of such substances include water scavengers (for example, silane coupling agents), adhesion promoters, surfactants, curing catalysts, film-formation aids, dryers, anti-fouling agents, sensitizers, antioxidants, photostabilizers, UV absorbers, water resistant agents, antiseptic and antifungal agents, defoamers, leveling agents, dispersants, flame retardants, antistatic agents, release agents, deodorants, and fragrances.

(Method of Preparing Curable Composition)

The curable composition of the present invention can be produced by using known methods for producing sealants, adhesives, and the like. For example, the curable composition of the present invention is produced by mixing the components of the binder, plasticizer, filler, rheology control agent, or the like described above with a three-roll mill, a dissolver, or the like, and then kneading the mixture while being heated under reduced pressure. The heating temperature during kneading may be, for example, 25 to 70° C.

(Applications of Curable Composition)

The curable composition of the present invention can be used as sealants for buildings, ships, automobiles, roads, medical devices, and the like; adhesives such as elastic adhesives, contact adhesives, tile adhesives, interior panel adhesives, exterior panel adhesives, tile adhesives, stone adhesives, ceiling finishing adhesives, flooring finishing adhesives, wall finishing adhesives, vehicle panel adhesives, and assembling adhesives for electric, electronic, and precision devices; adhesives such as medical adhesives; electric and electronic materials such as solar cell backside sealants; electrical isolating materials such as insulating covering materials for electric wires and cables; food packaging materials; coating materials; molding agents; vibration-proofing materials; damping materials; sound-proofing materials; foaming materials; paints; spraying materials; medical materials; electric conductive materials for shielding electromagnetic waves; thermal conductive materials; hot-melt materials; electric and electronic potting agents; films; gaskets; and various molding materials.

[Mechanism of Improving Storage Stability]

Figure 1:
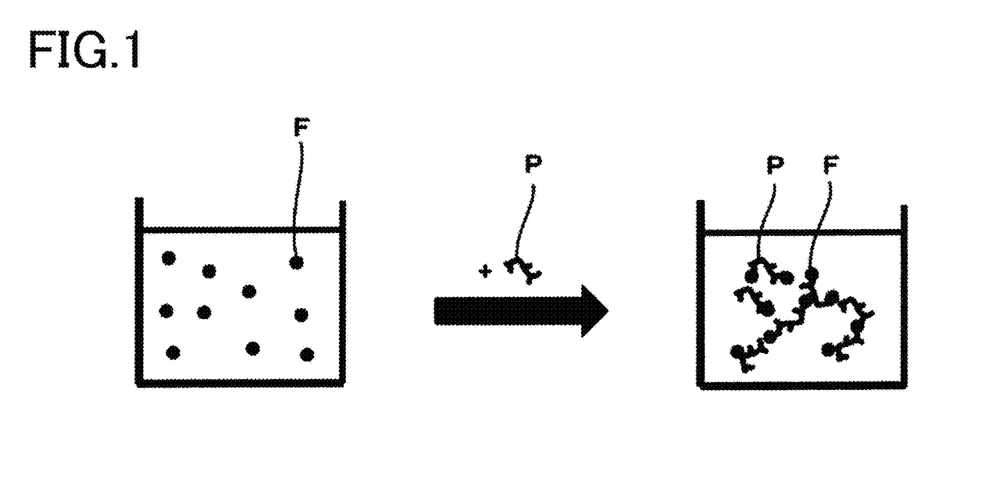
FIG. 1 is a schematic diagram illustrating a mechanism by which a polyamide compound (B) stabilizes a filler contained in a curable composition.
Figure 2:
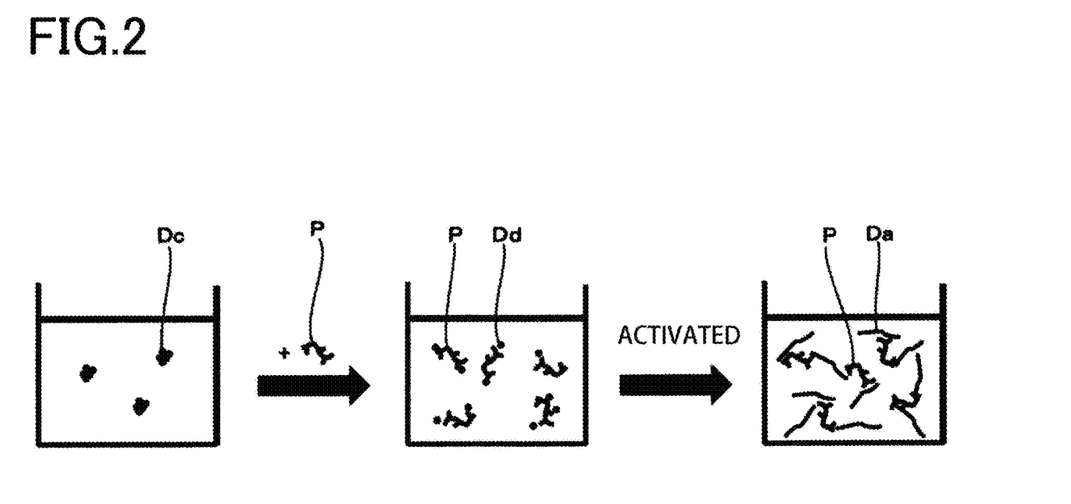
FIG. 2 is a schematic diagram illustrating a mechanism by which a polyamide compound (B) disperses aggregates of a diamide compound (A) and/or a hydrogenated castor oil (A') to promote activation of the diamide compound (A) and/or the hydrogenated castor oil (A').

With reference to FIGS. 1 and 2, a mechanism of improving storage stability of the above curable composition assumed by the present inventors will be described. FIG. 1 is a schematic diagram illustrating a mechanism by which the polyamide compound (B) stabilizes a filler contained in the curable composition, and FIG. 2 is a schematic diagram illustrating a mechanism by which the polyamide compound (B) disperses aggregates of the diamide compound (A) and/or the hydrogenated castor oil (A') to promote activation of the diamide compound (A) and/or the hydrogenated castor oil (A').

First, the left view in FIG. 1 shows a case where a filler such as calcium carbonate or titanium oxide is contained in the curable composition. In this case, solid particles F of the filler and the like are dispersed by a shear force during kneading. Since the polyamide compound (B) is not used as the rheology control agent, the solid particles F of the filler and the like cannot remain dispersed due to the van der Waals forces acting as attractive forces therebetween. Accordingly, reaggregation of the solid particles F of the filler and the like occurs. This causes a change in viscosity, such as inhomogeneous viscosity of the entire system of the curable composition.

On the other hand, according to the rheology control agent of the present invention, a mixture in which the diamide compound (A) and/or the hydrogenated castor oil (A') is mixed with the polyamide compound (B) is used. In this case, as shown in FIG. 1, since molecules P of the polyamide compound (B) are adsorbed to the solid particles F of the filler and the like by acid base interaction or the like, reaggregation of the solid particles F does not occur due to steric hindrance effect of the adsorbed molecules P of the polyamide compound (B). As a result, stable rheology modifying effect such as homogeneous rheology modifying of the entire system of the curable composition can be obtained and maintained.

When the molecules P of the polyamide compound (B) are not sufficiently dispersed in the entire system of the curable composition, the above rheology modifying effect cannot be stably obtained. The dispersion state of the molecules P of the polyamide compound (B) in the entire system varies depending on the combination (compatibility) between the polyamide compound (B) and the binder resin or plasticizer. For example, when a polyamide compound obtained by polycondensation of the amine component (B1) other than derivatives of polymerized fatty acids and the carboxylic acid component (B2) other than polymerized fatty acids is used instead of the polyamide compound (B) of the present invention, the polyamide compound cannot be sufficiently dispersed in the entire system of the curable composition due to its high crystallizability.

Further, when the weight-average molecular weight Mw of the polyamide compound (B) is too high, the adsorption rate of the molecules P of the polyamide compound (B) to the solid particles F becomes slow. Accordingly, the effect of preventing reaggregation may decrease. On the other hand, when the weight-average molecular weight Mw of the polyamide compound (B) is too low, the solid particles F are not sufficiently dispersed due to insufficient steric hindrance effect. As a result, the effect of preventing reaggregation may decrease. For these reasons, the weight-average molecular weight Mw of the polyamide compound (B) is preferably 2,000 or more and 50,000 or less as described above.

Second, regardless of the presence or absence of solid particles of the filler and the like, as shown in FIG. 2, in which a mixture of the diamide compound (A) and the polyamide compound (B) is used as the rheology control agent, aggregates Dc of the powder (solid particles) Dd of the diamide compound (A) are dispersed by the molecules P of the polyamide compound (B). The diamide compound (A) in the state of the aggregates Dc is not likely to assume an acicular shape (that is, not likely to be activated). However, when the aggregates Dc of the diamide compound (A) are dispersed into solid particles Dd by the molecules P of the polyamide compound (B), the diamide compound (A) is likely to assume an acicular shape Da. Thus, due to the molecules P of the polyamide compound (B) being present in the curable composition, the aggregates Dc of the diamide compound (A) are dispersed, promoting activation of the diamide compound (A).

As a result, the curable composition containing the rheology control agent of the present invention has an increased initial viscosity. Further, the activated diamide compound (A) imparts stable viscosity to the system of the curable composition, and the stable structure (shown in the right view in FIG. 2) is maintained and stabilized by the action of the polyamide compound (B). This stable structure changes little over time, and thus improves storage stability.

By the mechanism described in FIG. 2, the molecules P of the polyamide compound (B) act to disperse the aggregates of the powder (solid particles) of the diamide compound (A) regardless of the type of the diamide compound (A). Further, when the hydrogenated castor oil (A') is used instead of or in addition to the diamide compound (A), the molecules P of the polyamide compound (B) also act to disperse the aggregates of the powder (solid particles) of the hydrogenated castor oil (A') by the mechanism described in FIG. 2.

The preferred embodiments of the present invention have been described above, but the present invention is not limited to the aforementioned embodiments. That is, other embodiments or various modifications that would occur to those skilled in the art within the scope of the appended claims should be construed as being within the technical scope of the present invention.

EXAMPLES

The present invention will be specifically described below by using examples. Further, the present invention is not limited to these examples in any way. In the examples, "%" and "parts" indicate "mass %" and "parts by mass," respectively, unless otherwise specified.

[Synthesis of Polyamide Compound (B)]

First, the amine component (B1) and the carboxylic acid component (B2) described in Table 1 as raw materials were introduced into a four-neck flask at molar ratios described in Table 1. The mixture was heated while being stirred under a nitrogen gas stream, and reacted at 150° C. for 1 hour, and then further reacted at 175° C. for 2 hours. Thus, the polyamide compounds (B) of Synthesis Examples B1 to B26 and Comparative Synthesis Examples B1 and B2 described in Table 1 were obtained. The amide compounds of Comparative Synthesis Examples B1 and B2 (hereinafter, referred to as a "compound (B')") are Synthesis Examples that do not correspond to the polyamide compound (B) of the present invention. The "12HSA" in Table 1 refers to a hydrogenated castor oil fatty acid.

The weight-average molecular weight Mw of Synthesis Examples B1 to B26 and Comparative Synthesis Examples B1 and B2 obtained as described above were measured. Specifically, a value calculated based on the molecular weight of standard polystyrene in a chromatogram measured by GPC was used as the weight-average molecular weight Mw. The weight-average molecular weight was measured by using "HLC-8320GPC" (trade name, manufactured by Tosoh Corporation) as a measurement device for GPC, and one "GPCKF-801" and two "GPCKF-802" (trade name, both manufactured by Shodex Co., Ltd) as three columns under the conditions of a mobile phase; tetrahydrofuran, a measurement temperature of 40° C., a flow rate of 1 cc/min., and a detector; RI (Refractive Index). Since the terminal of the polyamide compound (B) of Synthesis Example B17 was an amine, the weight-average molecular weight could not be measured by using GPC. Accordingly, the weight-average molecular weight of Synthesis Example B17 is not described in Table 1.

TABLE 1

Formulation composition and molecular weight of polyamide compound (B)

| No. | Amine component (B1)/mol | | | | | | | | Carboxylic acid component (B2)/mol |
|---|---|---|---|---|---|---|---|---|---|
| | EDA C2 | TMDA C4 | HMDA C6 | OMDA C8 | DMDA C12 | DDA C36 | TTA C54 | Stearyl amine C18 | Adipic acid C6 |
| Synthesis Example B1 | 0.48 | | | | | | | | |
| Synthesis Example B2 | | | | 0.32 | | | | | |
| Synthesis Example B3 | | 0.42 | | | | | | | |
| Synthesis Example B4 | | | | | 0.51 | | | | |
| Synthesis Example B5 | | | | | | 0.41 | | | |
| Synthesis Example B6 | 0.77 | | | | | | | | 0.61 |
| Synthesis Example B7 | | | | | | 0.26 | | | |

TABLE 1-continued

Formulation composition and molecular weight of polyamide compound (B)

| No. | | | | | | |
|---|---|---|---|---|---|---|
| Synthesis Example B8 | | | | 0.39 | | 0.53 |
| Synthesis Example B9 | 0.30 | | | | | |
| Synthesis Example B10 | | 0.34 | | | | |
| Synthesis Example B11 | 0.55 | | | | | |
| Synthesis Example B12 | 0.27 | | | | | |
| Synthesis Example B13 | 0.63 | | | | | |
| Synthesis Example B14 | 0.59 | | | | | |
| Synthesis Example B15 | | | 0.41 | | | |
| Synthesis Example B16 | | | 0.29 | | | |
| Synthesis Example B17 | | | 0.30 | | | 0.21 |
| Synthesis Example B18 | 0.35 | | | | | |
| Synthesis Example B19 | | 0.39 | 0.04 | | | |
| Synthesis Example B20 | | | | 0.47 | | 0.77 |
| Synthesis Example B21 | 0.07 | | | | | |
| Synthesis Example B22 | 0.21 | | | | | |
| Synthesis Example B23 | 0.73 | | | | | |
| Synthesis Example B24 | 0.36 | | | | | |
| Synthesis Example B25 | 0.75 | | | | | |
| Synthesis Example B26 | 0.59 | | | | 0.07 | |
| Comparative Synthesis Example B1 | | | | | 0.88 | |
| Comparative Synthesis Example B2 | | | 0.52 | | | |

| | Carboxylic acid component (B2)/mol | | | | | | | |
|---|---|---|---|---|---|---|---|---|
| No. | Azelaic acid C9 | Dimer acid C36 | Trimer acid C54 | 12HSA C18 | Oleic acid C18 | Stearic acid C18 | Ricinoleic acid C18 | Mw |
| Synthesis Example B1 | | 0.66 | | | | | | 6990 |
| Synthesis Example B2 | | 0.48 | | | | | | 7035 |
| Synthesis Example B3 | | 0.59 | | | | | | 6981 |
| Synthesis Example B4 | | 0.78 | | | | | | 7772 |
| Synthesis Example B5 | | 0.66 | | | | | | 6975 |
| Synthesis Example B6 | | 1.08 | | | | | | 6622 |
| Synthesis Example B7 | 0.38 | | | | | | | 5208 |
| Synthesis Example B8 | | | | | | | | 5132 |
| Synthesis Example B9 | | 0.41 | | 0.04 | | | | 6068 |
| Synthesis Example B10 | | | 0.39 | 0.05 | | | | 42823 |
| Synthesis Example B11 | | 0.71 | | | | | | 9574 |
| Synthesis Example B12 | | 0.54 | | | | | | 3342 |
| Synthesis Example B13 | | 0.75 | | | | | | 14062 |

TABLE 1-continued

Formulation composition and molecular weight of polyamide compound (B)

| | | | | | |
|---|---|---|---|---|---|
| Synthesis Example B14 | | 0.66 | | | 19930 |
| Synthesis Example B15 | | 0.46 | | | 18362 |
| Synthesis Example B16 | | 0.31 | | | 21477 |
| Synthesis Example B17 | | | | | — |
| Synthesis Example B18 | 0.05 | 0.45 | | | 7155 |
| Synthesis Example B19 | | 0.66 | | | 7039 |
| Synthesis Example B20 | | | | | 6560 |
| Synthesis Example B21 | | | 0.37 | | 2094 |
| Synthesis Example B22 | | | 0.42 | | 4138 |
| Synthesis Example B23 | | | 1.45 | | 7030 |
| Synthesis Example B24 | | 0.29 | | 0.15 | 7937 |
| Synthesis Example B25 | | 0.60 | | 0.31 | 8382 |
| Synthesis Example B26 | | 0.87 | | | 7091 |
| Comparative Synthesis Example B1 | | 0.44 | | | 2129 |
| Comparative Synthesis Example B2 | | | | 1.05 | 1871 |

[Synthesis of Diamide Compound (A) and Production of Viscosity Modifier]

Next, a method of synthesizing the diamide compound (A) and a method of synthesizing the rheology control agent will be described.

Preparation Examples 1 to 30

The diamine component (A1) and the monocarboxylic acid component (A2) described in Table 2 were reacted at 190° C. for 6 hours under a nitrogen gas stream while removing the generated water to thereby obtain a diamide compound (A) of Synthesis Example A1. Then, each of the polyamide compounds (B) of Synthesis Examples B1 to B26 obtained as described above were added thereto and melted and mixed. Further, the melting mixture was taken out as a solid, and the solid mixture was broken down using a mill into particles with a median diameter in the range of 1 μm to 10 Thus, the rheology control agents of Preparation Examples 1 to 30 were obtained.

Preparation Example 31

The diamine component (A1) and the monocarboxylic acid component (A2) described in Table 2 were reacted at 190° C. for 6 hours under a nitrogen gas stream while removing the generated water to thereby obtain a diamide compound. Then, C-wax (manufactured by Kokura Synthetic Industries, Ltd.) was added as the hydrogenated castor oil (A') and melted and mixed to thereby obtain a diamide compound (A) of Synthesis Example A2. Further, the polyamide compound (B) of Synthesis Example B2 was added thereto and melted and mixed. Then, the melting mixture was taken out as a solid, and the solid mixture was broken down using a mill into particles with a median diameter in the range of 1 μm to 10 Thus, the rheology control agent of Preparation Example 31 was obtained.

Preparation Examples 32 to 46

When C-wax (manufactured by Kokura Synthetic Industries, Ltd.) was used as the hydrogenated castor oil (A'), the polyamide compounds (B) of Synthesis Examples B1 to B5 and B11 to B16 were added to the heated melt of the hydrogenated castor oil (A'), and melted and mixed. Further, the melting mixture was taken out as a solid, and the solid mixture was broken down using a mill into particles with a median diameter in the range of 1 μm to 10 μm. Thus, the rheology control agents of Preparation Examples 32 to 46 were obtained.

Comparative Preparation Examples 1 and 2

The rheology control agents of Comparative Preparation Examples 1 and 2 were prepared in the same manner as Preparation Example 2 except that a compound (B') was used in Comparative Synthesis Examples B1 and B2 instead of the polyamide compound (B) of Synthesis Example B1.

Comparative Preparation Example 3

After the diamide compound (A) of Synthesis Example A1 was obtained in the same manner as Preparation Example 1, the mixture was taken out as a solid without adding the polyamide compound (B) thereto. The solid was broken down using a mill into particles with a median diameter in the range of 1 μm to 10 μm. Thus, the rheology control agent of Comparative Preparation Example 3 was obtained.

Comparative Preparation Example 4

After the diamide compound (A) of Synthesis Example A2 was obtained in the same manner as Preparation Example 31, the mixture was taken out as a solid without adding the polyamide compound (B) thereto. The solid was broken down using a mill into particles with a median diameter in the range of 1 µm to 10 µm. Thus, the rheology control agent of Comparative Preparation Example 4 was obtained.

Comparative Preparation Example 5

The melt mixture of the hydrogenated castor oil (A') as in Preparation Example 32 was taken out as a solid, and the solid was broken down using a mill into particles with a median diameter in the range of 1 µm to 10 µm. Thus, the rheology control agent of Comparative Preparation Example 5 was obtained.

Table 3 shows the component and formulation amount of the rheology control agents of Preparation Examples 1 to 46 and Comparative Preparation Examples 1 to 5.

TABLE 2

Table 2 Formulation compositon of diamide compound (A)

| Component | | Synthesis Example A1 Formulation amount (mol) | Synthesis Example A2 Formulation amount (mol) |
|---|---|---|---|
| Diamide component (A1) | EDA | 0.9 | 1 |
| | TMDA | 0.1 | — |
| Monocarboxylic acid component (A2) | Hydrogenated castor oil fatty acid | 1.4 | 1.2 |
| | Caprylic acid | 0.2 | — |
| | Capric acid | 0.4 | 0.8 |
| Diamide compound (A) | | — | 75 mass % |
| Hydrogenated castor oil (A') | | — | 25 mass % |

TABLE 3

Table 3 Formulation composition of rheology control agent

| No. | Diamide compound (A) or Hydrogenated castor oil (A') Synthesis Example or trade name | Formulation amount/mass % | Polyamide compound (B) or Compound (B') Synthesis Example | Formulation amount/mass % |
|---|---|---|---|---|
| Preparation Example 1 | Synthesis Example A1 | 95 | Synthesis Example B1 | 5 |
| Preparation Example 2 | Synthesis Example A1 | 90 | Synthesis Example B1 | 10 |
| Preparation Example 3 | Synthesis Example A1 | 80 | Synthesis Example B1 | 20 |
| Preparation Example 4 | Synthesis Example A1 | 70 | Synthesis Example B1 | 30 |
| Preparation Example 5 | Synthesis Example A1 | 60 | Synthesis Example B1 | 40 |
| Preparation Example 6 | Synthesis Example A1 | 90 | Synthesis Example B2 | 10 |
| Preparation Example 7 | Synthesis Example A1 | 90 | Synthesis Example B3 | 10 |
| Preparation Example 8 | Synthesis Example A1 | 90 | Synthesis Example B4 | 10 |
| Preparation Example 9 | Synthesis Example A1 | 90 | Synthesis Example B5 | 10 |
| Preparation Example 10 | Synthesis Example A1 | 90 | Synthesis Example B6 | 10 |
| Preparation Example 11 | Synthesis Example A1 | 90 | Synthesis Example B7 | 10 |
| Preparation Example 12 | Synthesis Example A1 | 90 | Synthesis Example B8 | 10 |
| Preparation Example 13 | Synthesis Example A1 | 90 | Synthesis Example B9 | 10 |
| Preparation Example 14 | Synthesis Example A1 | 90 | Synthesis Example B10 | 10 |
| Preparation Example 15 | Synthesis Example A1 | 90 | Synthesis Example B11 | 10 |
| Preparation Example 16 | Synthesis Example A1 | 90 | Synthesis Example B12 | 10 |
| Preparation Example 17 | Synthesis Example A1 | 90 | Synthesis Example B13 | 10 |
| Preparation Example 18 | Synthesis Example A1 | 90 | Synthesis Example B14 | 10 |
| Preparation Example 19 | Synthesis Example A1 | 90 | Synthesis Example B15 | 10 |
| Preparation Example 20 | Synthesis Example A1 | 90 | Synthesis Example B16 | 10 |
| Preparation Example 21 | Synthesis Example A1 | 90 | Synthesis Example B17 | 10 |
| Preparation Example 22 | Synthesis Example A1 | 90 | Synthesis Example B18 | 10 |
| Preparation Example 23 | Synthesis Example A1 | 90 | Synthesis Example B19 | 10 |
| Preparation Example 24 | Synthesis Example A1 | 90 | Synthesis Example B20 | 10 |
| Preparation Example 25 | Synthesis Example A1 | 90 | Synthesis Example B21 | 10 |
| Preparation Example 26 | Synthesis Example A1 | 90 | Synthesis Example B22 | 10 |
| Preparation Example 27 | Synthesis Example A1 | 90 | Synthesis Example B23 | 10 |
| Preparation Example 28 | Synthesis Example A1 | 90 | Synthesis Example B24 | 10 |
| Preparation Example 29 | Synthesis Example A1 | 90 | Synthesis Example B25 | 10 |
| Preparation Example 30 | Synthesis Example A1 | 90 | Synthesis Example B26 | 10 |
| Preparation Example 31 | Synthesis Example A2 | 90 | Synthesis Example B2 | 10 |
| Preparation Example 32 | C-wax | 90 | Synthesis Example B1 | 10 |
| Preparation Example 33 | C-wax | 95 | Synthesis Example B1 | 5 |
| Preparation Example 34 | C-wax | 80 | Synthesis Example B1 | 20 |
| Preparation Example 35 | C-wax | 70 | Synthesis Example B1 | 30 |
| Preparation Example 36 | C-wax | 60 | Synthesis Example B1 | 40 |
| Preparation Example 37 | C-wax | 90 | Synthesis Example B2 | 10 |
| Preparation Example 38 | C-wax | 90 | Synthesis Example B3 | 10 |
| Preparation Example 39 | C-wax | 90 | Synthesis Example B4 | 10 |
| Preparation Example 40 | C-wax | 90 | Synthesis Example B5 | 10 |
| Preparation Example 41 | C-wax | 90 | Synthesis Example B11 | 10 |
| Preparation Example 42 | C-wax | 90 | Synthesis Example B12 | 10 |
| Preparation Example 43 | C-wax | 90 | Synthesis Example B13 | 10 |
| Preparation Example 44 | C-wax | 90 | Synthesis Example B14 | 10 |
| Preparation Example 45 | C-wax | 90 | Synthesis Example B15 | 10 |
| Preparation Example 46 | C-wax | 90 | Synthesis Example B16 | 10 |

TABLE 3-continued

Table 3 Formulation composition of rheology control agent

| No. | Diamide compound (A) or Hydrogenated castor oil (A') | | Polyamide compound (B) or Compound (B') | |
|---|---|---|---|---|
| | Synthesis Example or trade name | Formulation amount/mass % | Synthesis Example | Formulation amount/mass % |
| Comparative Preparation Example 1 | Synthesis Example A1 | 90 | Comparative Synthesis Example B1 | 10 |
| Comparative Preparation Example 2 | Synthesis Example A1 | 90 | Comparative Synthesis Example B2 | 10 |
| Comparative Preparation Example 3 | Synthesis Example A1 | 100 | — | 0 |
| Comparative Preparation Example 4 | Synthesis Example A2 | 100 | — | 0 |
| Comparative Preparation Example 5 | C-wax | 100 | — | 0 |

[Production of Curable Composition]

The curable compositions of Examples 1 to 49 and Comparative Examples 1 to 9 were prepared by using the rheology control agents of Preparation Examples 1 to 46 and Comparative Preparation Examples 1 to 5 with the formulation A shown in Table 4 or the formulation B shown in Table 5.

Examples 1 to 49 and Comparative Examples 1 to 9

Specifically, in Examples 1 to 32, 35 to 48, Comparative Examples 1 to 5, and 7, 100 parts of MS polymer S203 (modified silicone resin manufactured by Kaneka Corporation) as a binder (resin), 30 parts of Sansocizer DINP (diisononyl phthalate manufactured by New Japan Chemical Co., Ltd.) as a plasticizer, 160 parts of Whiton SB (ground calcium carbonate manufactured by Shiraishi Kogyo Kaisha, Ltd.), 50 parts of Hakuenka CCR (precipitated calcium carbonate manufactured by Shiraishi Kogyo Kaisha, Ltd.), and 7 parts of the rheology control agent of any one of Preparation Examples 1 to 32 and Comparative Preparation Examples 1 to 5 as a rheology control agent were predispersed by a three-roll mill, and then the mixture was kneaded using a planetary mixer at 45° C. under reduced pressure. Then, 3 parts of Silquest A-171 (manufactured by Momentive Performance Materials Inc.) as a water scavenger, and 3 parts of Silquest A-1122 (manufactured by Momentive Performance Materials Inc.) as an adhesion promoter were added to the kneaded product, and the mixture was kneaded using a planetary mixer. Thus, curable compositions of Examples 1 to 32, 35 to 48 and Comparative Examples 1 to 5, and 7 were obtained. In Examples 33, 34, 49 and Comparative Examples 6, 8, and 9, 100 parts of MS polymer S203 (modified silicone resin manufactured by Kaneka Corporation) as a binder (resin), 60 parts of Sansocizer DINP (diisononyl phthalate manufactured by New Japan Chemical Co., Ltd.) as a plasticizer, 150 parts of Whiton SB (ground calcium carbonate manufactured by Shiraishi Kogyo Kaisha, Ltd.), 15 parts of Tipaque R-820 (Rutile titanium oxide manufactured by Ishihara Sangyo Kaisha, Ltd.), and 7 parts of the rheology control agent of any one of Preparation Examples 2, 9 and Comparative Preparation Example 1 as a rheology control agent were predispersed by a dissolver, and then the mixture was kneaded using a planetary mixer at 45° C. under reduced pressure. Then, 3 parts of Silquest A-171 (manufactured by Momentive Performance Materials Inc.) as a water scavenger, and 3 parts of Silquest A-1122 (manufactured by Momentive Performance Materials Inc.) as an adhesion promoter were added to the kneaded product, and the mixture was kneaded using a planetary mixer. Thus, curable compositions of Examples 33, 34, 49 and Comparative Examples 6, 8, and 9 were obtained. Further, curable compositions of Comparative Example 7 and Comparative Example 9 were obtained by adding no rheology control agent to the formulation A and the formulation B, respectively. Each curable composition was filled into two sealable containers. The curable compositions filled into the two containers were used as samples for initial viscosity evaluation and storage stability evaluation. Table 6 shows the rheology control agents and the formulations used for Examples 1 to 49 and Comparative Examples 1 to 6, and 8.

TABLE 4

Table 4 Formulation composition of curable composition (formulation A)

| Component | Formulation amount (parts) |
|---|---|
| MS polymer S203 | 100 |
| Sansocizer DINP | 30 |
| Whiton SB | 160 |
| Halcuenka CCR | 50 |
| Rheology control agent | 7 |
| | 347 |
| Silquest A-171 | 3 |
| Silquest A-1122 | 3 |
| Total | 353 |

TABLE 5

Table 5 Formulation composition of curable composition (formulation B)

| Component | Formulation amount (parts) |
|---|---|
| MS polymer S203 | 100 |
| Sansocizer DINP | 60 |
| Whiton SB | 150 |
| Tipaque R-820 | 15 |
| Rheology control agent | 7 |
| | 332 |
| Silquest A-171 | 3 |
| Silquest A-1122 | 3 |
| | 338 |

TABLE 6

| | | Diamide compound (A) or Hydrogenated castor oil (A') | | Polyamide compound (B) or Compound (B') |
|---|---|---|---|---|
| | Rheology control agent | Type | Formulation amount/mass % | Type |
| Example 1 | Preparation Example 1 | Synthesis Example A1 | 95 | Synthesis Example B1 |
| Example 2 | Preparation Example 2 | Synthesis Example A1 | 90 | Synthesis Example B1 |
| Example 3 | Preparation Example 3 | Synthesis Example A1 | 80 | Synthesis Example B1 |
| Example 4 | Preparation Example 4 | Synthesis Example A1 | 70 | Synthesis Example B1 |
| Example 5 | Preparation Example 5 | Synthesis Example A1 | 60 | Synthesis Example B1 |
| Example 6 | Preparation Example 6 | Synthesis Example A1 | 90 | Synthesis Example B2 |
| Example 7 | Preparation Example 7 | Synthesis Example A1 | 90 | Synthesis Example B3 |
| Example 8 | Preparation Example 8 | Synthesis Example A1 | 90 | Synthesis Example B4 |
| Example 9 | Preparation Example 9 | Synthesis Example A1 | 90 | Synthesis Example B5 |
| Example 10 | Preparation Example 10 | Synthesis Example A1 | 90 | Synthesis Example B6 |
| Example 11 | Preparation Example 11 | Synthesis Example A1 | 90 | Synthesis Example B7 |
| Example 12 | Preparation Example 12 | Synthesis Example A1 | 90 | Synthesis Example B8 |
| Example 13 | Preparation Example 13 | Synthesis Example A1 | 90 | Synthesis Example B9 |
| Example 14 | Preparation Example 14 | Synthesis Example A1 | 90 | Synthesis Example B10 |
| Example 15 | Preparation Example 15 | Synthesis Example A1 | 90 | Synthesis Example B11 |
| Example 16 | Preparation Example 16 | Synthesis Example A1 | 90 | Synthesis Example B12 |
| Example 17 | Preparation Example 17 | Synthesis Example A1 | 90 | Synthesis Example B13 |
| Example 18 | Preparation Example 18 | Synthesis Example A1 | 90 | Synthesis Example B14 |
| Example 19 | Preparation Example 19 | Synthesis Example A1 | 90 | Synthesis Example B15 |
| Example 20 | Preparation Example 20 | Synthesis Example A1 | 90 | Synthesis Example B16 |
| Example 21 | Preparation Example 21 | Synthesis Example A1 | 90 | Synthesis Example B17 |
| Example 22 | Preparation Example 22 | Synthesis Example A1 | 90 | Synthesis Example B18 |
| Example 23 | Preparation Example 23 | Synthesis Example A1 | 90 | Synthesis Example B19 |
| Example 24 | Preparation Example 24 | Synthesis Example A1 | 90 | Synthesis Example B20 |
| Example 25 | Preparation Example 25 | Synthesis Example A1 | 90 | Synthesis Example B21 |
| Example 26 | Preparation Example 26 | Synthesis Example A1 | 90 | Synthesis Example B22 |
| Example 27 | Preparation Example 27 | Synthesis Example A1 | 90 | Synthesis Example B23 |
| Example 28 | Preparation Example 28 | Synthesis Example A1 | 90 | Synthesis Example B24 |
| Example 29 | Preparation Example 29 | Synthesis Example A1 | 90 | Synthesis Example B25 |
| Example 30 | Preparation Example 30 | Synthesis Example A1 | 90 | Synthesis Example B26 |
| Example 31 | Preparation Example 31 | Synthesis Example A2 | 90 | Synthesis Example B2 |
| Example 32 | Preparation Example 32 | C-wax | 90 | Synthesis Example B1 |
| Example 33 | Preparation Example 2 | Synthesis Example A1 | 90 | Synthesis Example B1 |
| Example 34 | Preparation Example 9 | Synthesis Example A1 | 90 | Synthesis Example B5 |
| Example 35 | Preparation Example 33 | C-wax | 95 | Synthesis Example B1 |
| Example 36 | Preparation Example 34 | C-wax | 80 | Synthesis Example B1 |
| Example 37 | Preparation Example 35 | C-wax | 70 | Synthesis Example B1 |
| Example 38 | Preparation Example 36 | C-wax | 60 | Synthesis Example B1 |
| Example 39 | Preparation Example 37 | C-wax | 90 | Synthesis Example B2 |
| Example 40 | Preparation Example 38 | C-wax | 90 | Synthesis Example B3 |
| Example 41 | Preparation Example 39 | C-wax | 90 | Synthesis Example B4 |
| Example 42 | Preparation Example 40 | C-wax | 90 | Synthesis Example B5 |
| Example 43 | Preparation Example 41 | C-wax | 90 | Synthesis Example B11 |
| Example 44 | Preparation Example 42 | C-wax | 90 | Synthesis Example B12 |
| Example 45 | Preparation Example 43 | C-wax | 90 | Synthesis Example B13 |
| Example 46 | Preparation Example 44 | C-wax | 90 | Synthesis Example B14 |
| Example 47 | Preparation Example 45 | C-wax | 90 | Synthesis Example B15 |
| Example 48 | Preparation Example 46 | C-wax | 90 | Synthesis Example B16 |
| Example 49 | Preparation Example 32 | C-wax | 90 | Synthesis Example B1 |
| Comparative Example 1 | Comprative Preparation Example 1 | Synthesis Example A1 | 90 | Comparative Synthesis Example B1 |
| Comparative Example 2 | Comprative Preparation Example 2 | Synthesis Example A1 | 90 | Comparative Synthesis Example B2 |
| Comparative Example 3 | Comprative Preparation Example 3 | Synthesis Example A1 | 100 | — |
| Comparative Example 4 | Comprative Preparation Example 4 | Synthesis Example A2 | 100 | — |
| Comparative Example 5 | Comprative Preparation Example 5 | C-wax | 100 | — |
| Comparative Example 6 | Comprative Preparation Example 1 | Synthesis Example A1 | 100 | — |
| Comparative Example 7 | — | — | — | — |
| Comparative Example 8 | Comprative Preparation Example 5 | C-wax | 100 | — |
| Comparative Example 9 | — | — | — | — |

TABLE 6-continued

Evaluation of curable composition

| | Polyamide compound (B) or Compound (B') | | | | |
|---|---|---|---|---|---|
| | Mw | Formulation amount/mass % | Formulation | Initial Viscosity | Storage stability |
| Example 1 | 6990 | 5 | Formulation A | A | B |
| Example 2 | 6990 | 10 | Formulation A | A | A |
| Example 3 | 6990 | 20 | Formulation A | A | A |
| Example 4 | 6990 | 30 | Formulation A | B | A |
| Example 5 | 6990 | 40 | Formulation A | B | B |
| Example 6 | 7035 | 10 | Formulation A | A | A |
| Example 7 | 6981 | 10 | Formulation A | A | A |
| Example 8 | 7772 | 10 | Formulation A | A | B |
| Example 9 | 6975 | 10 | Formulation A | A | B |
| Example 10 | 6622 | 10 | Formulation A | C | B |
| Example 11 | 5208 | 10 | Formulation A | A | B |
| Example 12 | 5132 | 10 | Formulation A | A | B |
| Example 13 | 6068 | 10 | Formulation A | B | A |
| Example 14 | 42823 | 10 | Formulation A | A | C |
| Example 15 | 9574 | 10 | Formulation A | B | A |
| Example 16 | 3342 | 10 | Formulation A | B | A |
| Example 17 | 14062 | 10 | Formulation A | B | B |
| Example 18 | 19930 | 10 | Formulation A | C | C |
| Example 19 | 18362 | 10 | Formulation A | A | B |
| Example 20 | 21477 | 10 | Formulation A | B | C |
| Example 21 | — | 10 | Formulation A | B | C |
| Example 22 | 7155 | 10 | Formulation A | A | C |
| Example 23 | 7039 | 10 | Formulation A | A | B |
| Example 24 | 6560 | 10 | Formulation A | A | C |
| Example 25 | 2094 | 10 | Formulation A | A | A |
| Example 26 | 4138 | 10 | Formulation A | A | A |
| Example 27 | 7030 | 10 | Formulation A | A | A |
| Example 28 | 7937 | 10 | Formulation A | C | C |
| Example 29 | 8382 | 10 | Formulation A | C | C |
| Example 30 | 7091 | 10 | Formulation A | C | B |
| Example 31 | 7035 | 10 | Formulation A | A | A |
| Example 32 | 6990 | 10 | Formulation A | A | A |
| Example 33 | 6990 | 10 | Formulation B | A | A |
| Example 34 | 6975 | 10 | Formulation B | A | B |
| Example 35 | 6990 | 5 | Formulation A | A | A |
| Example 36 | 6990 | 20 | Formulation A | A | A |
| Example 37 | 6990 | 30 | Formulation A | A | A |
| Example 38 | 6990 | 40 | Formulation A | B | B |
| Example 39 | 7035 | 10 | Formulation A | A | A |
| Example 40 | 6981 | 10 | Formulation A | A | A |
| Example 41 | 7772 | 10 | Formulation A | A | A |
| Example 42 | 6975 | 10 | Formulation A | A | B |
| Example 43 | 9574 | 10 | Formulation A | A | A |
| Example 44 | 3342 | 10 | Formulation A | A | B |
| Example 45 | 14062 | 10 | Formulation A | A | B |
| Example 46 | 19930 | 10 | Formulation A | B | C |
| Example 47 | 18362 | 10 | Formulation A | A | B |
| Example 48 | 21477 | 10 | Formulation A | B | C |
| Example 49 | 6990 | 10 | Formulation B | A | A |
| Comparative Example 1 | 2129 | 10 | Formulation A | B | D |
| Comparative Example 2 | 1871 | 10 | Formulation A | B | D |
| Comparative Example 3 | — | — | Formulation A | A | D |
| Comparative Example 4 | — | — | Formulation A | A | D |
| Comparative Example 5 | — | — | Formulation A | A | D |
| Comparative Example 6 | — | — | Formulation B | A | D |
| Comparative Example 7 | — | — | Formulation A | D | B |
| Comparative Example 8 | — | — | Formulation B | A | D |
| Comparative Example 9 | — | — | Formulation B | D | A |

* Comparative Examples 7 and 9 do not contain a rheology control agent in Formulation A.

[Evaluation Method]

For the curable compositions of Examples 1 to 49 and Comparative Examples 1 to 9 obtained as described above, evaluation of initial viscosity and storage stability was performed. In the evaluation of initial viscosity and storage stability, the viscosity was measured using a rheometer, and the viscosity at a shear rate of 0.1 s$^{-1}$ was used as a measurement.

(Initial Viscosity)

In the evaluation of initial viscosity, a viscosity (hereinafter, referred to as an "initial viscosity $V_0$") of each curable composition was measured on the day after preparation. Then, a relative value of the initial viscosity $V_0$ (hereinafter, referred to as a "viscosity index $I_1$") of each curable composition to the viscosity of the diamide compound (A) or the hydrogenated castor oil (A'), which was used (as a base material) in the examples and comparative examples, taken as 100 was obtained. The viscosity index $I_1$ was evaluated according to the criteria described below. The viscosity index $I_1$ being 100 means that the initial viscosity $V_0$ of the curable composition was the same as (had no change from) the viscosity of the diamide compound (A) or the hydrogenated castor oil (A'), which was a base material. Therefore, the greater the viscosity index $I_1$, the higher the initial viscosity.

A: Viscosity index $I_1$ is 90 or more
B: Viscosity index $I_1$ is 70 or more and less than 90
C: Viscosity index $I_1$ is 50 or more and less than 70
D: Viscosity index $I_1$ is less than 50

(Storage Stability)

The storage stability was evaluated as follows. First, a viscosity of each curable composition after being stored at 50° C. for 2 weeks (hereinafter, referred to as a "viscosity after storage Vs") was measured, and a change rate ΔV (=(Vs−$V_0$)/$V_0$×100) of the viscosity after storage Vs to the initial viscosity $V_0$ was calculated. Further, a change rate ΔVb of the viscosity after storage Vs to the initial viscosity $V_0$ of the diamide compound (A) or the hydrogenated castor oil (A') as a base material was calculated in the same manner as above. Then, a relative value of the viscosity change rate ΔV (hereinafter, referred to as "viscosity change index $I_2$") of each curable composition to the viscosity change rate ΔVb taken as 100 was obtained. The viscosity change index $I_2$ was evaluated according to the criteria described below. The viscosity change index $I_2$ being 100 means that the viscosity change rate ΔV of the curable composition was the same as (had no change from) the viscosity change rate ΔVb. Therefore, the smaller the viscosity change index 12, the higher the storage stability, compared with the diamide compound (A) or the hydrogenated castor oil (A') as a base material.

A: Viscosity change index 12 is 25 or less
B: Viscosity change index 12 is over 25 and 50 or less
C: Viscosity change index 12 is over 50 and 75 or less
D: Viscosity change index 12 is over 75

[Evaluation Results]

Table 6 shows the evaluation results for the initial viscosity and the storage stability evaluated as described above.

As seen from Table 6, the curable compositions of Examples 1 to 49 have fair (grade C or higher) results in initial viscosity and storage stability.

In the composition of the rheology control agent made of the diamide compound (A) and the polyamide compound (B), from the comparison among Examples 2, 6 to 9, it is found that storage stability is excellent (grade A) when the diamine component (B1) has 2 to 8 carbon atoms. Further, in the composition of the rheology control agent made of the hydrogenated castor oil (A') and the polyamide compound (B), from the comparison among Examples 32, and 39 to 42, it is found that storage stability is excellent (grade A) when the diamine component (B1) has 2 to 12 carbon atoms.

Next, in the composition of the rheology control agent made of the diamide compound (A) and the polyamide compound (B), from the comparison among Examples 2, and 15 to 18, in which EDA is used as the diamine component (B1) and dimer acid is used as the carboxylic acid component (B2), it is found that initial viscosity and storage stability are good (grade B or higher) when the weight-average molecular weight Mw of the polyamide compound (B) is 19,000 or less, and storage stability is excellent (grade A) when the weight-average molecular weight Mw is 12,000 or less. Further, from Examples 25 to 27, it is found that, for example, when a trimer acid is used as the carboxylic acid component (B2), initial viscosity and storage stability are excellent (grade A) when the weight-average molecular weight Mw of the polyamide compound (B) is 2,000 or more. Next, in the composition of the rheology control agent made of the hydrogenated castor oil (A') and the polyamide compound (B), from the comparison among Examples 32, and 43 to 46, in which EDA is used as the diamine component (B1) and the dimer acid is used as the carboxylic acid component (B2), it is found that initial viscosity and storage stability are good (grade B or higher) when the weight-average molecular weight Mw of the polyamide compound (B) is 19,000 or less, and storage stability is excellent (grade A) when the weight-average molecular weight Mw is 3,500 or more and 12,000 or less.

Furthermore, Examples 10 and 30, in which monoamine is contained as the diamine component (B1), have fair (grade C or higher) results in initial viscosity and storage stability. Accordingly, it is found that, even if monoamine is contained, the effect of suppressing a decrease in initial viscosity and the effect of improving storage stability can be obtained as long as at least one of diamine having 2 to 54 carbon atoms and triamine having 2 to 54 carbon atoms is contained as the amine component (B1). Further, as shown in Example 23, it is found that, when two or more diamines are used as the amine component (B1), the effect of suppressing a decrease in initial viscosity and the effect of improving storage stability can also be obtained.

Furthermore, Examples 13 and 14, in which monocarboxylic acid is contained as the carboxylic acid component (B2), have fair (grade C or higher) results in initial viscosity and storage stability. Accordingly, it is found that, even if monocarboxylic acid is contained, the effect of suppressing a decrease in initial viscosity and the effect of improving storage stability can be obtained as long as at least one of dicarboxylic acid having 4 to 54 carbon atoms and tricarboxylic acid having 4 to 54 carbon atoms is contained as the carboxylic acid component (B2). Further, as shown in Example 22, it is found that, when two or more dicarboxylic acids are used as the carboxylic acid component (B2), the effect of suppressing a decrease in initial viscosity and the effect of improving storage stability can also be obtained.

In addition, as shown in Example 21, in which an excess amount of the amine component (B1) is used and the terminal of the polyamide compound (B) is an amino group; Example 10, in which an excess amount of the carboxylic acid component (B2) is used and the terminal carboxyl group is capped with a monoamine; and Examples 28 and 29, in which an excess amount of the amine component (B1) is used and the terminal amino group is capped with a monocarboxylic acid, it is found that the effect of suppressing a decrease in initial viscosity and the effect of improving storage stability can be obtained.

From the comparison between Example 6 and Example 31, it is found that a strong effect of suppressing a decrease in initial viscosity and a strong effect of improving storage stability are obtained regardless of the type of the diamide compound (A) as a base material.

From the comparison between Example 2 and Example 32, it is found that a strong effect of suppressing a decrease in initial viscosity and a strong effect of improving storage stability are obtained regardless of whether the diamide compound (A) or the hydrogenated castor oil (A') is used for the rheology control agent.

From the comparison between Example 2 and Example 33, comparison between Example 9 and Example 34, and comparison between Example 32 and Example 49, it is found that a strong effect of suppressing a decrease in initial viscosity and a strong effect of improving storage stability are obtained regardless of the type of the filler.

Next, in the composition of the rheology control agent made of the diamide compound (A) and the polyamide compound (B), it is found that initial viscosity is excellent (grade A or higher) when the formulation amount of the polyamide compound (B) is 5 mass % or more and 20 mass % or less, and storage stability is excellent (grade A or higher) when the formulation amount is 10 mass % or more and 30 mass % or less. Further, in the composition of the rheology control agent made of the hydrogenated castor oil (A') and the polyamide compound (B), it is found that initial viscosity and storage stability are excellent (grade A or more) when the formulation amount of the polyamide compound (B) is 5 mass % or more and 30 mass % or less.

On the other hand, in Comparative Example 1, which does not contain diamine and triamine as the amine component (B1), and Comparative Example 2, which does not contain dicarboxylic acid and tricarboxylic acid as the carboxylic acid component (B2), it is found that initial viscosity is good, whereas storage stability is poor (grade D). In Comparative Examples 3 to 6, and 8, in which the rheology control agent contains only the diamide compound (A) or the hydrogenated castor oil (A'), it is found that initial viscosity is good, whereas storage stability is poor (grade D). Further, in Comparative Examples 7 and 9, in which the curable composition contains no rheology control agent, it is found initial viscosity is poor (grade D).

The invention claimed is:

1. A rheology control agent for a curable composition, the rheology control agent comprising:
   a diamide compound (A), the diamide compound (A) being obtained by condensation reaction between a diamine component (A1) and a monocarboxylic acid component (A2); and
   a polyamide compound (B) obtained by polycondensation of an amine component (B1) and a carboxylic acid component (B2), wherein
   the amine component (B1) contains at least one amine selected from the group consisting of a diamine with 2 to 54 carbon atoms and a triamine with 2 to 54 carbon atoms,
   the carboxylic acid component (B2) contains at least one carboxylic acid selected from the group consisting of a dicarboxylic acid with 4 to 54 carbon atoms and a tricarboxylic acid with 4 to 54 carbon atoms,
   the polyamide compound (B) is a polyamide obtained by polycondensation of at least one of the amine component (B1) containing polymerized fatty acid derivatives and the carboxylic acid component (B2) containing polymerized fatty acids,
   a content of the polyamide compound (B) is 1 wt % to 30 wt % with respect to a total amount of the polyamide compound (B) and the diamide compound (A), and the rheology control agent is in a form of a powdered solid, and
   the polyamide compound (B) has a weight-average molecular weight of 2,000 to 50,000.

2. The rheology control agent according to claim 1, wherein the amine component (B1) contains a diamine or a triamine with 2 to 12 carbon atoms.

3. The rheology control agent according to claim 1, wherein the carboxylic acid component (B2) contains at least polymerized fatty acids.

4. The rheology control agent according to claim 1, wherein a reaction molar ratio (B1/B2) between the amine component (B1) and the carboxylic acid component (B2) is less than 1.

5. The rheology control agent according to claim 1, wherein a cured product of the curable composition is used as a sealant or an adhesive.

6. A curable composition comprising:
   a binder; and
   a rheology control agent, the rheology control agent comprising:
   a diamide compound (A), the diamide compound (A) being obtained by condensation reaction between a diamine component (A1) and a monocarboxylic acid component (A2); and
   a polyamide compound (B) obtained by polycondensation of an amine component (B1) and a carboxylic acid component (B2), wherein
   the amine component (B1) contains at least one amine selected from the group consisting of a diamine with 2 to 54 carbon atoms and a triamine with 2 to 54 carbon atoms,
   the carboxylic acid component (B2) contains at least one carboxylic acid selected from the group consisting of a dicarboxylic acid with 4 to 54 carbon atoms and a tricarboxylic acid with 4 to 54 carbon atoms,
   the polyamide compound (B) is a polyamide obtained by polycondensation of at least one of the amine component (B1) containing polymerized fatty acid derivatives and the carboxylic acid component (B2) containing polymerized fatty acids,
   a content of the polyamide compound (B) is 1 wt % to 30 wt % with respect to a total amount of the polyamide compound (B) and the diamide compound (A), and the rheology control agent is in a form of a powdered solid, and
   the polyamide compound (B) has a weight-average molecular weight of 2,000 to 50,000.

7. The curable composition according to claim 6, further comprising a filler.

* * * * *